US012644814B2

(12) United States Patent
Baldwin et al.

(10) Patent No.: US 12,644,814 B2
(45) Date of Patent: Jun. 2, 2026

(54) AEROSOL CONCENTRATION SENSOR CALIBRATION DEVICE

(71) Applicant: Kidde Technologies, Inc., Wilson, NC (US)

(72) Inventors: Eli Baldwin, Knightdale, NC (US);
James Varnell, Black Creek, NC (US);
Saul Salas, Knightdale, NC (US)

(73) Assignee: Kidde Technologies, Inc., Wilson, NC (US)

( * ) Notice: Subject to any disclaimer, the term of this patent is extended or adjusted under 35 U.S.C. 154(b) by 248 days.

(21) Appl. No.: 18/236,191

(22) Filed: Aug. 21, 2023

(65) Prior Publication Data

US 2025/0067651 A1     Feb. 27, 2025

(51) Int. Cl.
| | |
|---|---|
| *G01N 15/06* | (2024.01) |
| *G01N 15/075* | (2024.01) |
| *G01N 1/22* | (2006.01) |
| *G01N 5/00* | (2006.01) |
| *G01N 15/00* | (2006.01) |
| *G01N 21/27* | (2006.01) |

(Continued)

(52) U.S. Cl.
CPC ........... *G01N 15/06* (2013.01); *G01N 15/075* (2024.01); *G01N 2001/2223* (2013.01); *G01N 5/00* (2013.01); *G01N 2015/0046* (2013.01); *G01N 21/274* (2013.01); *G01N 2021/8578* (2013.01); *G01N 2030/8447* (2013.01); *G01N 31/223* (2013.01)

(58) Field of Classification Search
CPC ........ G01N 15/06; G01N 15/075; G01N 5/00;

G01N 21/274; G01N 31/223; G01N 2001/2223; G01N 2015/0046; G01N 2021/8578; G01N 2030/8447
See application file for complete search history.

(56) References Cited

U.S. PATENT DOCUMENTS

| | | | | | |
|---|---|---|---|---|---|
| 4,928,537 | A | * | 5/1990 | Liu | ...................... G01N 1/2202 73/864.33 |
| 6,854,460 | B1 | * | 2/2005 | Shofner, II | ........ A61M 15/0065 128/203.15 |

(Continued)

FOREIGN PATENT DOCUMENTS

WO          2023044643 A1     3/2023

OTHER PUBLICATIONS

Extended European Search Report for EP Application No. 24195750. 5, Dated Jan. 27, 2025, pp. 7.

(Continued)

*Primary Examiner* — Benjamin R Schmitt
(74) *Attorney, Agent, or Firm* — Kinney & Lange, P.A.; Nick E Stewart

(57)          ABSTRACT

An aerosol concentration sensor calibration device includes a mixing column, a sensor, and a collection vessel. The mixing column extends in a vertical orientation between an inlet at a bottom of the mixing column and an outlet at a top of the mixing column, the mixing column configured to receive a mixture of a powder and a compressed gas at the inlet. The sensor is disposed in the mixing column and configured to measure the concentration of the powder in the mixing column. The collection vessel has an inlet fluidly coupled to the outlet of the mixing column. The collection vessel is configured to collect the powder received from the mixing column.

19 Claims, 2 Drawing Sheets

(51) Int. Cl.
| | | |
|---|---|---|
| *G01N 21/85* | (2006.01) | |
| *G01N 30/84* | (2006.01) | |
| *G01N 31/22* | (2006.01) | |

(56) References Cited

U.S. PATENT DOCUMENTS

| | | | |
|---|---|---|---|
| 8,004,684 B2 | 8/2011 | Powell et al. | |
| 11,604,131 B2 | 3/2023 | Farmer et al. | |
| 2008/0213136 A1* | 9/2008 | Caron | B05B 7/0012 |
| | | | 422/120 |
| 2010/0259756 A1 | 10/2010 | Powell et al. | |

OTHER PUBLICATIONS

Gorner Peter et al: "Workplace aerosol mass concentration measurement using optical particle counters", Journal of Environmental Monitoring, vol. 14, No. 2, Jan. 1, 2012 (Jan. 1, 2012), pp. 420-428, XP093237027, ISSN: 1464-0325, DOI: 10.1039/C1EM10558B, Retrieved from the Internet: URL:https://pubs.rsc.org/en/content/articlepdf/2012/em/c1em10558b>.

* cited by examiner

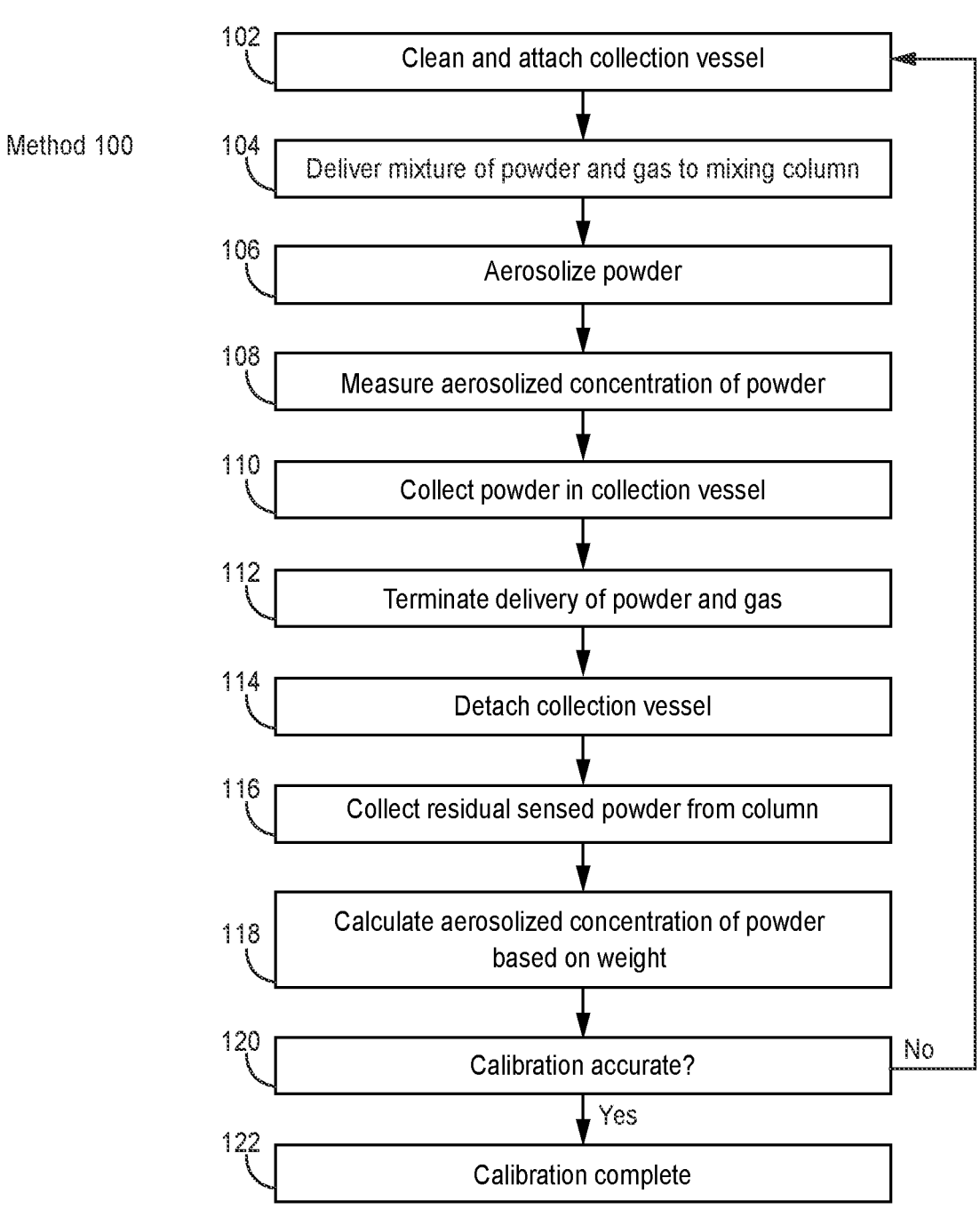

Method 100

102 — Clean and attach collection vessel

104 — Deliver mixture of powder and gas to mixing column

106 — Aerosolize powder

108 — Measure aerosolized concentration of powder

110 — Collect powder in collection vessel

112 — Terminate delivery of powder and gas

114 — Detach collection vessel

116 — Collect residual sensed powder from column

118 — Calculate aerosolized concentration of powder based on weight

120 — Calibration accurate?    No

Yes

122 — Calibration complete

FIG. 2

AEROSOL CONCENTRATION SENSOR CALIBRATION DEVICE

BACKGROUND

The present disclosure relates generally to fire suppression systems. More specifically, the present disclosure relates to a method and device for calibrating an aerosol concentration sensor.

In order to test and certify a dry powder fire suppression system onboard a vehicle such as an aircraft, a fire extinguishing agent is discharged into a protected volume while an analyzer records the amount of fire extinguishing agent present in various zones of the protected volume. The amount of agent must simultaneously exceed a predetermined level sufficient to extinguish all possible fires in all zones for a satisfactory period of time.

The analyzer must be calibrated such that analyzer output validates that the dry powder fire suppression system is capable of extinguishing any fire within the protected space. Calibrating an aerosol concentration sensor requires development of well mixed flow with fully aerosolized powder, and accurate characterization of the powder carrier gas volume. Carrier gas leakage and loss of agent due to incomplete aerosolization pose challenges for analyzer calibration of dry powder systems.

SUMMARY

According to an aspect of the present disclosure, an aerosol concentration sensor calibration device includes a mixing column, a sensor, and a collection vessel. The mixing column extends in a vertical orientation between an inlet at a bottom of the mixing column and an outlet at a top of the mixing column, the mixing column configured to receive a mixture of a powder and a compressed gas at the inlet. The sensor is disposed in the mixing column and configured to measure the concentration of the powder in the mixing column. The collection vessel has an inlet fluidly coupled to the outlet of the mixing column. The collection vessel is configured to collect the powder received from the mixing column.

According to a further aspect of the present disclosure, a method of calibrating an aerosol concentration sensor device includes delivering a mixture of a powder and a compressed gas to a mixing column. The mixing column extends in a vertical orientation between an inlet at a bottom of the mixing column and an outlet at a top of the mixing column. The mixing column extends such that the powder and the compressed gas flow upward through the mixing column. The method further includes aerosolizing the powder in the mixing column, measuring, via a sensor, an aerosolized concentration of the powder in the mixing column, collecting the powder in a collection vessel fluidly coupled to the outlet of the mixing column, terminating delivery of the mixture of the powder and the compressed gas to the mixing column, and calculating an aerosolized concentration of the powder in the mixing column based on a measured weight of the collected powder.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 2 is a flow diagram illustrating a representative method of calibrating an aerosol concentration sensor.

Figure 1:
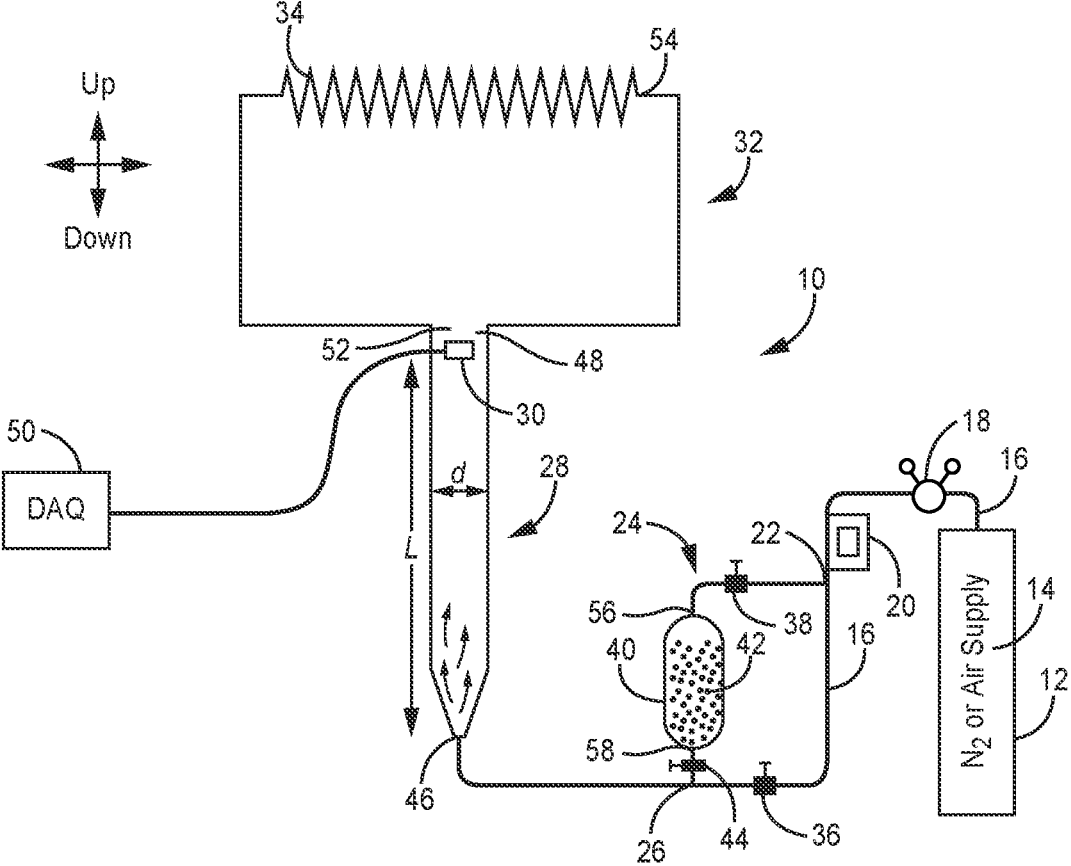
FIG. 1 is a schematic view of an aerosol concentration sensor calibration device 10.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure is directed to a method and apparatus for calibrating an aerosol concentration sensor configured to sense a concentration of dry powder particles within an aerosol cloud. As used herein, "aerosol cloud" refers to a mixture of a dry powder and a gas. The process of combining a dry powder with a gas and mixing the dry powder throughout that gas can be referred to herein as "aerosolization." The disclosed method and apparatus are configured to produce aerosol clouds with substantially uniform distribution of dry powder to allow for accurate measurement by the aerosol concentration sensor. Dry powder that has passed the sensor is collected and weighed for calibration of the sensor. The term "sensor" and "aerosol concentration sensor" are used interchangeably herein.

The aerosol concentration sensor calibration device described hereinafter includes (1) a mixture of a dry powder and a compressed gas, (2) a mixing column, (3) a concentration sensor, and (4) a collection vessel. During a calibration test, the dry powder mixes with compressed gas forming an aerosolized uniform mixture as the dry powder moves through the mixing column into the collection vessel. As the aerosolized mixture passes the concentration sensor, the concentration sensor measures the concentration of the aerosolized mixture. After a calibration test has been completed, the concentration sensor is adjusted as needed to compensate for any difference between the aerosolized concentration measured by the concentration sensor and the average aerosolized concentration that should have been recorded (i.e. the known actual concentration).

Halon 1301 (CF3Br) is commonly used in current industry-standard fire suppression practices. According to the Montreal Protocol, Halon 1301 is an ozone depleting gas that is currently permitted for use in the aircraft fire protection industry. It is desirable to replace halon 1301 with a non-ozone depleting fire extinguishing agent when the necessary technology becomes available. In addition to halon 1301's negative effects on ozone levels, the supply of halon 1301 in the world is diminishing.

This disclosure describes a system and accompanying method for calibrating and using a concentration sensor to conduct concentration testing in an engine environment. The dry powder used in this system is not ozone depleting, which solves the main environmental concern of using halon 1301. While halon 1301 is a gas, the fire suppression agent used in the present disclosure is a dry powder. This transition from gas to dry powder requires a different delivery mechanism to perform concentration testing. This alternative delivery mechanism is described in detail below.

When a new aircraft is fitted with a halon 1301 system, technicians conduct concentration testing of the halon 1301 at multiple locations throughout an engine or engines of the aircraft. Concentration testing in such systems is used to confirm that the halon 1301 system is delivering a sufficient quantity of fire suppression agent to an engine as well as providing adequate protection to the engine. As set forth in the present disclosure, several fully calibrated dry powder concentration sensors can be placed at multiple locations throughout an aircraft engine allowing dry powder to completely replace halon 1301 as a fire extinguishing agent.

FIG. 1 is a schematic view of device 10 for calibration of an aerosol concentration sensor. Device 10 can, for example, include gas supply 12, first conduit path 16, regulator 18, gas flowmeter 20, intersection 22, second conduit path 24, intersection 26, mixing column 28, concentration sensor 30, collection vessel 32, and filter 34. First conduit path 16 includes valve 36. Second conduit path 24 includes valve 38, powder vessel 40 (containing powder 42), and valve 44. Mixing column 28 extends from mixing column inlet 46 to mixing column outlet 48. Concentration sensor 30 provides sensor data to data acquisition unit 50. Collection vessel 32 extends from collection vessel inlet 52 to collection vessel outlet 54, and powder vessel 40 similarly extends from powder vessel inlet 56 to powder vessel outlet 58. FIG. 2 is a flowchart illustrating steps of method 100, a calibration method using device 10 to calibrate aerosol concentration sensor 30. FIGS. 1 and 2 are discussed together below.

Gas supply 12 can be a source of compressed gas including but not limited to an inert gas (e.g., nitrogen) or air, stored at high pressure, for example in one or more tanks. Gas supply 12 is connected to first conduit path 16. First conduit path 16 is a set of conduits that convey gas from gas supply 12 to mixing column inlet 46. Second conduit path 24 is a set of conduits fluidically parallel to a portion of first conduit path 16 and extending from intersection point 22 to intersection point 26. The conduits in first conduit path 16 or second conduit path 24 can be made of any type of connecting passage or channel known within the art, such as provided by pipes or tubes, and can for example be fastened to each other (i.e. at intersection points 22, 26) with any appropriately fluidly sealed attachment technique such as by brazing or welding the conduits together. The conduits are sealed with a high integrity seal such that outside air cannot leak into any portion of device 10. The sealing of the conduits ensures that once gas 14 leaves gas supply 12, the only way that gas 14 can exit first conduit path 16 is through mixing column inlet 46.

Gas supply 12 provides gas 14 to device 10. First conduit path 16 connects gas supply 12 to regulator 18. Regulator 18 controls the flow rate of gas 14 flowing from gas supply 12. Regulator 18 maintains the flow rate of gas 14 flowing from gas supply 12 to intersection point 22 at a desired level for a specific test of the device 10. An operator of device 10 can use regulator 18 to change the flow rate of gas 14 flowing out of regulator 18 into intersection point 22 as needed. Regulator 18 is placed before gas flowmeter 20, such that gas flowmeter 20 measures the flow rate of gas 14 exiting regulator 18.

Gas flowmeter 20 can be disposed within or attached to an outer wall of first conduit path 16. In the present embodiment of aerosol concentration sensor calibration device 10, gas flowmeter 20 serves two purposes. First, gas flowmeter 20 measures the mass flow rate of gas, which is later used to calculate aerosolized concentration. Second, gas flowmeter 20 verifies that the regulator is working properly, i.e. that regulator 18 is controlling the flow rate of gas 14 to a desired level. The desired level output by regulator 18 is reflected in the gas flowmeter readings. If reading values of gas flowmeter 20 are unexpected, then either the gas flowmeter or the regulator is not working properly. A system with a regulator first and a gas flowmeter second is effective at guaranteeing accurate calculations of aerosol concentrations.

Gas 14 exits regulator 18 and flows past gas flowmeter 20 to intersection point 22, where second conduit path 24 splits off of first conduit path 16. First conduit path 16 and second conduit path 24 rejoin at intersection point 26. Valve 36 is located along first conduit path 16 and regulates fluid flow between intersection point 22 and intersection point 26. In the illustrated embodiment, valve 36, valve 38, and valve 44 are flow control valves continuously or discretely actuatable between zero flow (i.e. completely closed to fluid) and full flow (i.e. completely open) states, and can be for example needle valves. In another embodiment, first conduit path 16 may include no valves and only one conduit connecting regulator 18 to mixing column inlet 46.

Valve 38 can be attached anywhere along second conduit path 24 between intersection points 22 and 26. Valve 38 gives the operator of device 10 more precise control of the flow of gas 14 into second conduit path 24, and can be used to completely stop the flow of gas 14 into second conduit path 24. Valves 36 and 38 can together be used to limit the flow of gas into powder vessel inlet 56.

Powder vessel 40 includes inlet 56 and outlet 58. Powder vessel 40 is fluidically connected to gas supply 12 through intersection point 22, second conduit path 24, and the portion of first conduit path 16 upstream of intersection point 22. Powder vessel inlet 56 and powder vessel outlet 58 are both openings in powder vessel 40. Powder vessel inlet 56 and powder vessel outlet 58 are both sealed in device 10 such that outside air cannot enter powder vessel 40 through powder vessel inlet 56 or powder vessel outlet 58. Compressed gas 14 enters powder vessel 40 through powder vessel inlet 56. Dry powder 42 can be stored in powder vessel 40 for calibration testing of device 10. Dry powder 42 can be a dry non-liquid fire suppression agent such as a sodium bicarbonate and/or potassium bicarbonate based agent. In some embodiments, dry powder 42 can have a hydrophobic or anti-caking coating to prevent clumping. Under some conditions, crystals of dry powder 42 may form loose clumps while stored in powder vessel 40. More specifically, some embodiments of dry powder 42 can begin to clump if exposed to humid conditions, especially for long periods of time. Such clumps are broken apart by high velocity flow through mixing column inlet 46 (see below). Powder vessel 40 and other containers of dry powder 42 can be fluidically sealed against environmental moisture to prevent clumping. First conduit 16 bypasses powder vessel 40, while second conduit 24 extends fluidically parallel to a portion of first conduit 16 and connects powder vessel 40 to the overall gas flow path of device 10.

In an embodiment shown in FIG. 1, a single powder vessel 40 is disposed along second conduit path 24. More generally, however, any number of powder vessels 40 (e.g. two or more) can be disposed along second conduit path 24, or along multiple separate, parallel second conduit paths 24. In embodiments of device 10 with multiple powder vessels 40, each such powder vessel can contain a different solid as desired. Compressed gas 14 exits powder vessel 40 through powder vessel outlet 58 and conveys at least one type of dry powder 42 along second conduit path 24 to intersection point 26, and thence along first conduit path 16 to mixing column inlet 46. The size of powder vessel outlet 58 is not determined by particular size by dry powder 42. In some embodiments, dry powder 42 is made of particles that are micron-scale in terms of size.

Valve 38 is disposed along second conduit path 24 between intersection point 22 and powder vessel 40. Once gas 14 enters second conduit path 24, gas 14 passes through valve 38 and enters powder vessel 40 through powder vessel inlet 56, flows through powder vessel 40, and exits powder vessel 40 through powder vessel outlet 58. Once gas exits powder vessel outlet 58, gas flows to valve 44. Valve 44 is disposed along second conduit path 24 between powder vessel 40 and intersection point 26. Valve 44 gives the operator of device 10 more precise control of the flow of gas 14 into intersection point 26. In some instances, valve 44 can be used to completely block gas 14 from reaching intersection point 26. Intersection point 26 is where second conduit path 24 ends, rejoining with first conduit path 16. From gas supply 12 up until intersection point 26, pure gas 14 or air flows through first conduit path 16. Dry powder 42 first enters first conduit path 16 at intersection point 26, and only when valves 38 and 44 are opened to permit flow along second conduit path 24 through powder vessel 40.

When a new calibration test begins, after collection vessel 32 is secured on mixing column 28, gas 14 is released from gas supply 12. In the depicted embodiment, valve 38 is completely closed at that the beginning of a new calibration test, preventing any gas flow through second conduit path 24 and forcing all gas flow exclusively through first conduit path 16. Mixing column inlet 28 consequently receives exclusively pure gas or air at this stage. By allowing pure gas or air to flow before adding dry powder 42 to compressed gas 14, gas flow in through device 10 can be adjusted using regulator 18 and gas flowmeter 20. Once device 10 provides a desired flow rate of gas 14 through first conduit path 16, powder 42 may be mixed into first conduit path 16 by opening second conduit path 24 to first conduit path 16 by actuating valves 36, 38, and 44. As gas 14 flows through second conduit path 24, dry powder 42 is entrained or otherwise carried by gas 14 out of powder vessel 40, through powder vessel outlet 58 and second conduit path 24, joining first conduit path 16 at intersection point 26. Once dry powder 42 reaches intersection point 26, dry powder 42 mixes with gas 14 flowing from first conduit path 16. A mixture of dry powder 42 and gas 14 flows from intersection point 26 to mixing column inlet 46.

Second conduit path 24 provides dry powder 42 to first conduit path 16. The separation of dry powder 42 from first conduit path 16 permits more precise control over the amount of dry powder 42 that is released over time into first conduit path 16. This improved control of the release of dry chemical powder 42 allows more precise control over the concentration of aerosolization of dry powder 42 in device 10 during calibration tests. Additionally, if aerosol concentrations are changed during a calibration test, valve 38 and valve 44 allow for accurate control of the changing aerosol concentration by controlling the amount of dry powder that is released over time into first conduit path 16. After a calibration test has been completed, valve 38 and valve 44 can be closed in order to terminate the flow of dry powder into second conduit path 24.

The end of first conduit path 16 delivers a mixture of dry powder 42 and entrained gas 14 to mixing column inlet 46. (Step 104). High flow rate of gas entering mixing column 28 provides a turbulent environment with high pressure and flow energy. In some embodiments, flow velocities within mixing column 28 can range from 0.2 to 10 meters/second. In some embodiments, a nozzle may be located at mixing column inlet 46. The nozzle can increase the control of gas 14 and dry powder 42 into mixing column 28. This environment aerosolizes dry powder 42 with gas 14, creating a uniform mixture of dry powder 42 and gas 14. (Step 106). When the mixture of dry powder 42 and gas 14 enters mixing column inlet 46, there may be varying concentrations of dry powder 42 within gas 14. Mixing column 28 ensures that dry powder 42 is fully aerosolized before the concentration of the aerosolized dry powder 42 is measured by concentration sensor 30. Mixing column 28 breaks down any clumps in dry powder 42 formed during storage in powder vessel 40 into a fully aerosolized cloud within gas 14. Full aerosolization means that every individual crystal of dry powder 42 is dispersed and floating in gas 14 independently. Aerosolized dry powder 42 is only counted once by sensor 30 during a calibration test. Due to the constant high pressure and high flow rate of gas 14 within mixing column 28, once dry powder 42 is aerosolized fully and passes sensor 30, the high flow rate of gas 14 pushes dry powder 42 into collection vessel 32 through collection vessel inlet 52. The high pressure and flow rate of gas 14 in mixing column 28 prevents backflow into mixing column 28 once gas 14 and any aerosolized powder 42 has entered collection vessel 32.

When dry powder 42 is not being fully aerosolized within mixing column 28, dry powder 42 will stick to the inside of the walls of mixing column 28. Under these conditions, the clumps of dry powder 42 that are released into mixing column 28 are not fully broken down. In other orientations of mixing column 28 in which dry powder 42 flows horizontally and/or vertically downward within mixing column 28, clumps of dry powder 42 would flow past the concentration sensor and are deposited into the collection vessel. Sensor 30 is not designed to accurately read the properties of unbroken clumps of dry powder 42, and non-vertical orientations of mixing column 28 would consequently introduce errors into the concentration measurements of sensor 30 by insufficiently aerosolizing dry powder 42 in gas 14. Dry powder 42 forming clumps or sticking to the walls of mixing column 28 are signs that mixing column 28 is not fully aerosolizing dry powder 42. Full aerosolization is one of the goals of calibration testing, because full aerosolization leads to more accurate concentration sensor readings, more uniform concentrations and delivery of dry powder 42, improving the effectiveness of fire suppression.

As noted above, mixing column 28 extends vertically (with respect to gravity) upward from mixing column inlet 46 to mixing column outlet 48. As dry powder 42 aerosolizes, dry powder 42 flows vertically upward against gravity within mixing column 28. The vertically upward flow of dry powder 42 within mixing column 28 breaks apart clumps of dry powder 42 and provides increased uniformity of dry powder 42 aerosolization within mixing column 28. During testing, horizontal and/or vertically downward flows of dry powder 42 within mixing column 28 were also investigated. These flow orientations produced lower rates of aerosolization of dry powder 42 than vertically upward flows within mixing column 28. More specifically, horizontal and/or vertically downward flows of dry powder 42 within mixing column 28 did not fully aerosolize dry powder 42 before it reached sensor 30, and significant quantities of dry powder stuck to the walls of mixing column 28. Sensor 30 registered incorrect aerosolization concentration measurements in horizontal and/or vertically downward flows of dry powder 42 within mixing column 28 due to dry powder 42 not being fully aerosolized within mixing column 28.

As illustrated in FIG. 1, mixing column 28 has length (i.e. vertical height) L measured from mixing column 46 to sensor 30, and diameter (or lateral width, more generally) d transverse to its length. More generally, mixing column 46 can have a non-circular cross-section defining a corresponding cross-sectional area. For the purposes of this discussion, diameter d serves as a stand-in for any appropriate set of width dimensions defining this cross-sectional area. A vertically upward flow of dry powder 42 within mixing column 28 has an improved aerosolization rate of dry powder 42 over other orientations of mixing column 28 for several reasons. First, in a vertically upward flow of dry powder 42 within mixing column 28, mixing column 28 is designed with a length over diameter ratio (L/d) selected to develop full aerosolization within mixing column 28. FIG. 1 is not drawn to scale. In the most general case, dimensions of the mixing column are selected to produce sufficiently complete aerosolization to ensure accurate calibration testing. In an exemplary embodiment, the length over diameter ratio in mixing column 28 is greater than 10. In a general case, the size of the diameter d of mixing column 28 can be determined by sensor 30. In an illustrative embodiment, mixing column 28 can be 8 cm in diameter. Depending on what sensor is used, diameters larger or smaller than 8 cm may be used for mixing column 28. In an illustrative embodiment, the length L of mixing column 28 can be 1.5 meters. By separating sensor 30 from inlet 46 by at least a vertical distance L defined with respect to diameter d by ratio R, device 10 ensures that any dry powder 42 that passes sensor 30 has been fully aerosolized. In some embodiments, a mixture of dry powder 42 and gas 14 flows from powder vessel outlet 58 to mixing column inlet 46 at speeds of 30 meters/second or more. In mixing column 28, any dry powder 42 that has not been fully aerosolized is too heavy to be pushed past sensor 30. Only fully aerosolized dry powder 42 is light enough to rise high enough in mixing column 28 to pass sensor 30. If clumps of non-fully aerosolized dry powder 42 begin rising vertically upward within mixing column 28, the ratio of mass to surface areas of the clumps will force the clumps of dry powder 42 to flow back down mixing column 28. As clumps of dry powder 42 return to a bottom portion of mixing column 28, dry powder 42 encounters a high energy flow of gas 14 from mixing column inlet 46 that further breaks apart dry powder 42. This cycle of rising upward and falling downward to mix and break apart further will continue for all dry powder 42, until dry powder 42 has been fully aerosolized. In an illustrative example, gas flow may be sustained for several minutes (e.g. five minutes) after the supply of dry powder 42 is cut off, allowing an overwhelming majority of dry powder 42 to settle and/or be trapped within filter 34.

Due to the combination of gravity, the turbulent environment inside mixing column 28, and placement of the sensor 30, only fully aerosolized dry powder 42 passes sensor 30. Sensor 30 can be any suitable particle concentration sensor or detector. In some embodiments, sensor 30 can for example be an optical sensor that determines powder concentration based on light obscuration. As the aerosol cloud (containing fully aerosolized dry powder 42 and gas 14) passes sensor 30, sensor 30 measures the concentration of aerosolized dry powder 42 within the aerosol cloud. (Step 108). The high rate of aerosolization within mixing column 28 allows the concentration measurement readings within sensor 30 to be highly accurate, as noted above. Once aerosolized concentrations have been measured by sensor 30, sensor readings reflecting these aerosolized concentrations are stored within a data acquisition unit (DAQ). DAQ 50 can, for example, be a subcomponent of sensor 30 or a separate computing device or component thereof. DAQ 50 is or includes a memory storage device that can include any one or combination of volatile memory elements (e.g., random access memory (RAM, such as DRAM, SRAM, SDRAM, VRAM, etc.)) and/or nonvolatile memory elements (e.g., ROM, hard drive, tape, CD ROM, etc.). Moreover, the memory may incorporate electronic, magnetic, optical, and/or other types of storage media. Sensor 30 is located at the top of mixing column 28 near mixing column outlet 48, for the reasons set forth above.

After flowing past sensor 30, the fully aerosolized dry powder 42 flows in an aerosol cloud vertically upward within mixing column 28 until the aerosol cloud enters collection vessel 32, which extends from inlet 52 to outlet 54. Gas 24 and aerosolized dry powder 42 enter collection vessel 32 through inlet 52, and filter 34 is located at collection vessel outlet 54. Collection vessel 32 is a container that stores the aerosolized dry powder 42 after dry powder 42 flows out of mixing column 28. (Step 110). Collection vessel 32 can be any shape or material necessary for calibration testing. Collection vessel 32 is fastened to mixing column 28 such that collection vessel inlet 52 is connected to mixing column outlet 48. Collection vessel 32 can be nondestructively detached or disconnected from and reconnected to mixing column 28. Collection vessel 32 can, for example, be removed from mixing column 28 at the beginning and the end of each calibration test to weigh collection vessel 32. Once the aerosol cloud enters collection vessel 32, the aerosolized dry powder 42 is separated from gas 14 by filter 34. Filter 34 can, for example, be a HEPA or ULPA style filter, and is sized to prevent egress of dry powder 42 from collection vessel 32 while allowing gas 14 to pass and exit collection vessel 32. As dry powder 42 is separated from gas 14, dry powder 42 settles within collection vessel 32.

Before a calibration test begins, collection vessel 32 is removed from mixing column 28, cleaned to remove any residual material (e.g. from previous tests), and weighed with a high precision scale to set a baseline weight of collection vessel 32. Collection vessel 32 is reattached to mixing column 28 for the duration of calibration testing (i.e. while sensor 30 measures aerosolized concentration of dry powder 42 within flow of gas 14). (Step 102) When a desired test duration has elapsed, flow of gas 14 is halted (Step 112) and collection vessel 32 is removed from mixing column 28. (Step 114) If dry powder 42 remains stuck to the inside of mixing column 28, any adhered powder located vertically between sensor 30 and mixing column outlet 48 is removed from mixing column 28 and added to the dry chemical powder 42 inside collection vessel 32, so that the powder contents of collection vessel 32 include all dry powder 42 that passed sensor 30 during the calibration test. (Step 116) The amount of dry powder 42 that is removed from the inside of mixing column 28 between sensor 30 and mixing column outlet 48 is typically less than or equal to 5% of the total powder used during the calibration test.

By subtracting the initial weight of collection vessel 32 from the weight of the removed powder plus the weight of collection vessel 32 after the calibration test, the total weight of the aerosolized dry powder 42 can be calculated. The volume of gas 14 used during the calibration test can be calculated by multiplying the flow rate of gas 14 during the calibration test (as metered by regulator 18 and measured by gas flowmeter 20) by the duration of the calibration test. Alternatively, if the flow rate of gas 14 is not held constant throughout testing, total gas volume can be calculated as an sum of mass flow rate in each sensing time step of gas flowmeter 20, or as the integral of gas flow as a function of time, as reported by gas flowmeter 20. The high integrity of fluid seals provided throughout device 10 ensures the accuracy of gas flow readings reflecting total flow through mixing column 28 during a calibration test. The average concentration of aerosolized dry powder 42 generated during the calibration test is calculated using the calculated weight of dry chemical powder 42 divided by the volume of gas 14 used during the calibration test. (Step 118). The average concentration of aerosolized dry powder 42 generated during the calibration test is compared to the measured concentration produced by sensor 30. (Step 120) If sensor 30 measured an incorrect aerosolized concentration (i.e. any value not reflecting the ratio of total dry powder mass/total gas mass), sensor 30 is adjusted and another calibration test is performed (returning from step 120 to step 102). This process is repeated until sensor 30 returns correct aerosolized concentration measurements, whereupon the calibration of sensor 30 is approved. (Step 122).

Sensor 30 can be tested at different aerosol concentrations and different flow rates to ensure proper calibration of sensor 30. Aerosol concentrations varying from 50 grams per cubic meter to 150 grams per cubic meter are especially important for airplane fire suppression. The present disclosure ensures highly accurate aerosolized concentrations within the range of 50 grams per cubic meter to 150 grams per cubic meter. Additionally, the present disclosure provides access to a large range of concentrations that can be aerosolized accurately. The present disclosure can accurately aerosolize dry powder 42 up to concentrations of 600 grams per cubic meter.

Discussion of Possible Embodiments

The following are non-exclusive descriptions of possible embodiments of the present invention.

An aerosol concentration sensor calibration device comprising: a mixing column extending in a vertical orientation with respect to gravity from an inlet at a bottom of the mixing column and an outlet at a top of the mixing column, the mixing column configured to receive a mixture of a powder and a compressed gas at the inlet; a sensor disposed in the mixing column and configured to measure a concentration of the powder within flow of the compressed gas, in the mixing column; and a collection vessel having an inlet fluidly coupled to the outlet of the mixing column, the collection vessel configured to collect the powder exiting the mixing column at the outlet.

The aerosol concentration sensor calibration device of the preceding paragraph can optionally include, additionally and/or alternatively, any one or more of the following features, configurations and/or additional components:

A further embodiment of the foregoing aerosol concentration sensor calibration device, wherein the sensor is disposed adjacent to the outlet of the mixing column.

A further embodiment of the foregoing aerosol concentration sensor calibration device, wherein a section of the mixing column extending from the inlet to the sensor has a vertical length and a lateral width transverse to the length, such that a ratio of the length to the lateral width is greater than or equal to 10.

A further embodiment of the foregoing aerosol concentration sensor calibration device, wherein the collection vessel is non-destructively removably fastened to the mixing column.

A further embodiment of the foregoing aerosol concentration sensor calibration device, wherein the collection vessel has an outlet filter, the outlet filter configured to exhaust compressed gas received from the mixing column while retaining the powder in the collection vessel.

A further embodiment of the foregoing aerosol concentration sensor calibration device, further comprising: a compressed gas source for supplying the compressed gas to the mixing column; and a powder vessel for supplying the powder to the mixing column, wherein the powder vessel has an inlet and an outlet, wherein the compressed gas source is fluidly coupled to the inlet of the powder vessel and the mixing column.

A further embodiment of the foregoing aerosol concentration sensor calibration device, further comprising: a first conduit fluidly connecting the compressed gas source to the mixing column and bypassing the powder vessel; a second conduit fluidly connected to the first conduit and parallel to a portion of the first conduit, wherein the powder vessel is disposed along the second conduit; a first valve disposed along the second conduit, upstream of the powder vessel; and a second valve disposed along the second conduit, upstream of the powder vessel.

A further embodiment of the foregoing aerosol concentration sensor calibration device, wherein the compressed gas source is fluidly coupled to the mixing column through the portion of the first conduit via a third valve.

A further embodiment of the foregoing aerosol concentration sensor calibration device, wherein the compressed gas source is a source of compressed nitrogen or air.

A further embodiment of the foregoing aerosol concentration sensor calibration device, wherein the powder is a dry chemical agent.

A further embodiment of the foregoing aerosol concentration sensor calibration device, further comprising a gas flowmeter disposed in a conduit upstream of the first and second conduits, the gas flow meter configured to measure a mass flow rate of the compressed gas.

A further embodiment of the foregoing aerosol concentration sensor calibration device, wherein the sensor is a light obscuration sensor.

A method of calibrating an aerosol concentration sensor device, the method comprising: delivering a mixture of a powder and a compressed gas to a mixing column, the mixing column extending in a vertical orientation with respect to gravity between an inlet at a bottom of the mixing column and an outlet at a top of the mixing column, such that the powder and the compressed gas flow upward through the mixing column; aerosolizing the powder within the compressed gas flow in the mixing column; measuring, via a sensor disposed proximate an outlet of the mixing column, an aerosolized concentration of the powder in the mixing column; collecting the powder in a collection vessel fluidly coupled to the outlet of the mixing column; terminating delivery of the mixture of the powder and the compressed gas to the mixing column; and calculating an aerosolized concentration of the powder in the mixing column based on a measured weight of the collected powder.

The method of the preceding paragraph can optionally include, additionally and/or alternatively, any one or more of the following features, configurations and/or additional components:

A further embodiment of the foregoing method, further comprising comparing the average aerosolized concentration to the measured aerosolized concentration.

A further embodiment of the foregoing method, further comprising removing the collection vessel from the mixing column to weigh the powder.

A further embodiment of the foregoing method, further comprising: removing any deposits of the powder collected on walls of the mixing column between the concentration sensor and the outlet; and weighing the removed powder, wherein the aerosolized concentration of the powder in the mixing column is calculated based on a measured weight of the collected powder in the collection vessel and the measured weight of the removed powder.

A further embodiment of the foregoing method, further comprising controlling, via a regulator, a flow rate of the compressed gas to the mixing column.

A further embodiment of the foregoing method, further comprising measuring, via a flow meter, a flow rate of the compressed gas through the regulator.

A further embodiment of the foregoing method, further comprising exhausting the compressed gas through an outlet filter of the collection vessel.

A further embodiment of the foregoing method, wherein delivering the mixture of compressed gas and aerosolized powder comprises releasing powder from a powder vessel into a flow of compressed gas and further comprising regulating, via a valve, a concentration of the powder delivered to the mixing column.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aerosol concentration sensor calibration device comprising:
    a mixing column extending in a vertical orientation with respect to gravity from an inlet at a bottom of the mixing column and an outlet at a top of the mixing column, the mixing column configured to receive a mixture of a powder and a flow of compressed gas at the inlet, wherein the powder is aerosolized in the flow of compressed gas;
    a sensor disposed in the mixing column adjacent to the outlet of the mixing column and configured to measure an aerosolized concentration of the powder within the flow of the compressed gas, in the mixing column; and
    a collection vessel having an inlet fluidly coupled to the outlet of the mixing column, the collection vessel configured to collect the powder exiting the mixing column at the outlet;

wherein the sensor is further configured to be adjusted as needed to compensate for any difference between the aerosolized concentration of the powder measured by the sensor and an average aerosolized concentration of the powder calculated based on a weight of powder collected in the collection vessel after delivery of the powder and the flow of compressed gas to the mixing column is terminated.

2. The aerosol concentration sensor calibration device of claim 1, wherein a section of the mixing column extending from the inlet to the sensor has a vertical length and a lateral width transverse to the length, such that a ratio of the length to the lateral width is greater than or equal to 10.

3. The aerosol concentration sensor calibration device of claim 1, wherein the collection vessel is non-destructively removably fastened to the mixing column.

4. The aerosol concentration sensor calibration device of claim 3, wherein the collection vessel has an outlet filter, the outlet filter configured to exhaust compressed gas received from the mixing column while retaining the powder in the collection vessel.

5. The aerosol concentration sensor calibration device of claim 4, and further comprising:
    a compressed gas source for supplying the compressed gas to the mixing column; and
    a powder vessel for supplying the powder to the mixing column, wherein the powder vessel has an inlet and an outlet,
    wherein the compressed gas source is fluidly coupled to the inlet of the powder vessel and the mixing column.

6. The aerosol concentration sensor calibration device of claim 5, further comprising:
    a first conduit fluidly connecting the compressed gas source to the mixing column and bypassing the powder vessel;
    a second conduit fluidly connected to the first conduit and parallel to a portion of the first conduit, wherein the powder vessel is disposed along the second conduit;
    a first valve disposed along the second conduit, upstream of the powder vessel; and
    a second valve disposed along the second conduit, upstream of the powder vessel.

7. The aerosol concentration sensor calibration device of claim 6, wherein the compressed gas source is fluidly coupled to the mixing column through the portion of the first conduit via a third valve.

8. The aerosol concentration sensor calibration device of claim 5, wherein the compressed gas source is a source of compressed nitrogen or air.

9. The aerosol concentration sensor calibration device of claim 5, wherein the powder is a dry chemical agent.

10. The aerosol concentration sensor calibration device of claim 5, and further comprising a gas flowmeter disposed in a conduit upstream of the first and second conduits, the gas flow meter configured to measure a mass flow rate of the compressed gas.

11. The aerosol concentration sensor calibration device of claim 1, wherein the sensor is a light obscuration sensor.

12. A method of calibrating an aerosol concentration sensor device, the method comprising:
    delivering a mixture of a powder and a compressed gas to a mixing column, the mixing column extending in a vertical orientation with respect to gravity between an inlet at a bottom of the mixing column and an outlet at a top of the mixing column, such that the powder and the compressed gas flow upward through the mixing column;

aerosolizing the powder within the compressed gas flow in the mixing column;

measuring, via a sensor disposed proximate an outlet of the mixing column, an aerosolized concentration of the powder in the mixing column;

collecting the powder in a collection vessel fluidly coupled to the outlet of the mixing column;

terminating delivery of the mixture of the powder and the compressed gas to the mixing column;

calculating an average aerosolized concentration of the powder in the mixing column based on a measured weight of the collected powder;

comparing the average aerosolized concentration of the powder in the mixing column based on the measured weight of the collected powder to the aerosolized concentration of the powder measured by the sensor; and adjusting the concentration sensor as needed to compensate for any difference between the average aerosolized concentration of the powder in the mixing column based on the measured weight of the collected powder and the aerosolized concentration of the powder measured by the sensor.

13. The method of claim 12, and further comprising comparing the average aerosolized concentration to the measured aerosolized concentration.

14. The method of claim 12 further comprising removing the collection vessel from the mixing column to weigh the powder.

15. The method of claim 14 further comprising:

removing any deposits of the powder collected on walls of the mixing column between the concentration sensor and the outlet; and weighing the removed powder, wherein the aerosolized concentration of the powder in the mixing column is calculated based on the measured weight of the collected powder in the collection vessel and the measured weight of the removed powder.

16. The method of claim 12 and further comprising controlling, via a regulator, a flow rate of the compressed gas to the mixing column.

17. The method of claim 12 and further comprising measuring, via a flow meter, a flow rate of the compressed gas through the regulator.

18. The method of claim 12 and further comprising exhausting the compressed gas through an outlet filter of the collection vessel.

19. The method of claim 12, wherein delivering the mixture of compressed gas and aerosolized powder comprises releasing powder from a powder vessel into a flow of compressed gas and further comprising regulating, via a valve, a concentration of the powder delivered to the mixing column.

\* \* \* \* \*